March 17, 1925.  1,529,795
M. F. JONES
WINDING FOR DYNAMO ELECTRIC MACHINES
Filed Nov. 23, 1922
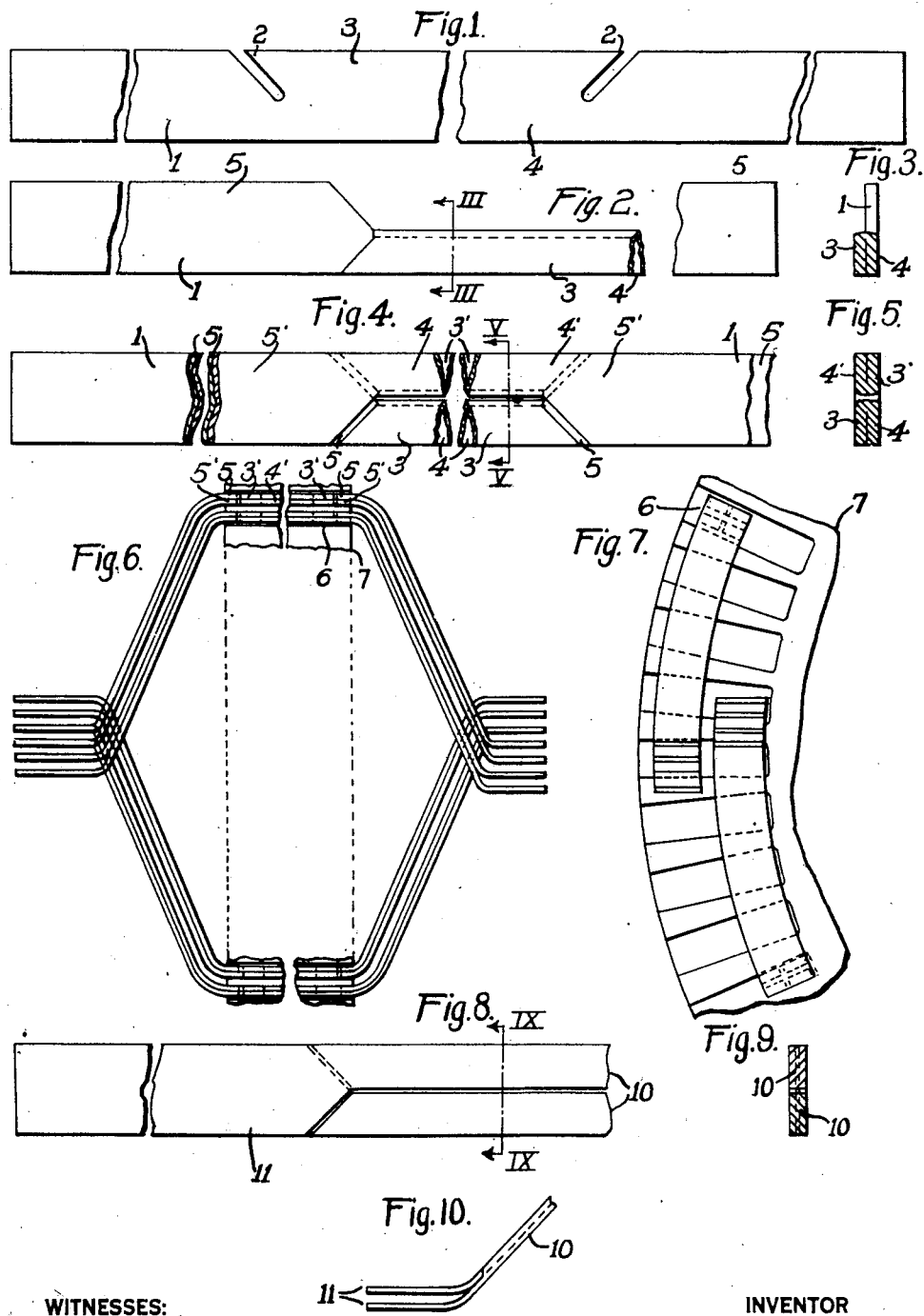
INVENTOR
Maurice F. Jones.
BY
ATTORNEY
WITNESSES:

Patented Mar. 17, 1925.

1,529,795

UNITED STATES PATENT OFFICE.

MAURICE F. JONES, OF WILKINSBURG, PENNSYLVANIA, ASSIGNOR TO WESTINGHOUSE ELECTRIC & MANUFACTURING COMPANY, A CORPORATION OF PENNSYLVANIA.

WINDING FOR DYNAMO-ELECTRIC MACHINES.

Application filed November 23, 1922. Serial No. 602,775.

*To all whom it may concern:*

Be it known that I, MAURICE F. JONES, a citizen of the United States, and a resident of Wilkinsburg, in the county of Allegheny and State of Pennsylvania, have invented a new and useful Improvement in Windings for Dynamo-Electric Machines, of which the following is a specification.

My invention relates to armature-coil construction and has particular relation to coils composed of deep, thin straps of copper and having an even number of straps per coil.

The construction of armature coil in which the inductors are split and crossed over, secures the benefit of deep, thin straps for connection to the commutator and, at the same time, it involves no more eddy-current loss than a strap of one-half the depth but has the disadvantage of being difficult to manufacture.

The object of my invention is, to provide a novel coil structure that may be easily manufctured and wherein the ratio of depth to thickness is less for that part of the coil in the armature slot than for the end connections, in order to minimize the eddy currents and to simplify the end connections.

My invention consists in a construction comprising pairs of conductors which are to be connected to adjacent commutator bars, the thickness of each being doubled and the depth halved throughout the active portion of the coil which lies in the armature slot, the conductors being placed one above the other within the slot, and one beside the other in the end connections.

In the accompanying drawing:

Figure 1 is a side view of a blank for forming a conductor before being pressed into shape, Fig. 2 is a side view of a portion thereof as it would appear when pressed into shape, Fig. 3 is an end view thereof, in section on the line III—III of Fig. 2, Fig. 4 is a side view of two of the conductors assembled and as they would appear in use, Fig. 5 is an end view thereof, in section on the line V—V of Fig. 4, Fig. 6 is a plan view of a plurality of the assembled coils, Fig. 7 is an end view of a portion of a rotor showing the application of the coils thereto, Fig. 8 is a side view of a modified form of the conductors as assembled, Fig. 9 is an end view thereof, in section on the line IX—IX of Fig. 8, and Fig. 10 is a plan view of the end portion thereof.

In the preferred structure, shown in Figs. 1 and 2, the coil member is constructed from a flat strap of copper 1, from one edge of which to the center thereof, extend the two spaced and oppositely inclined slits 2. The active portion 3 of the coil, lying between the slits 2, is then folded over and pressed down adjacent to the remaining portion 4. The folded portion 3, 4 thus has approximately one-half of the depth of the end portions 5 but approximately double the thickness thereof and, consequently, the cross-sectional areas are approximately the same.

In practice, two of the coil members, after being properly insulated, are disposed, the one upon the other, in reverse order, as shown more clearly in Figs. 4 and 5, that is to say, the active or thickened portion of the one occupying the space above the other, the ends of both being then in side by side relation for convenience in the arrangement of the end connections.

When the coil members are thus assembled, they are placed in the slot 6 of the core 7, two such assemblies being shown in each slot in this instance, and when the conductors are disposed in the slot they occupy the same space as would be required if they were of uniform thickness throughout.

In the modification shown in Figs. 8, 9 and 10, the straps 10 are the correct size for the slot portion, and the ends 11 are suitably shaped, as by working the straps to the thinner formation. The slot portions 10 are of solid form, the increased thickness being offset to one side of the ends 11, similar to the preferred structure. Two of the straps 10 are also adapted to be disposed one above the other, as in the preferrred structure and as shown in Figs. 8 and 10.

While I have shown and described two embodiments of my invention, it will be evident that numerous modifications may be adopted within the spirit of my invention, I desire, therefore, that the appended claims shall be accorded the broadest construction, consistent with the prior art.

I claim as my invention:

1. A dynamo-electric machine comprising a magnetizable core member provided with slots, a plurality of serially connected coils having coil sides disposed in said slots, each slot containing the coil sides of two different coils, the coil sides within the slots being of reduced height and increased thickness with respect to the end connections.

2. A dynamo-electric machine comprising a magnetizable core member provided with slots, a plurality of serially connected coils having coil sides disposed in said slots, each slot containing the coil sides of two different coils, the coil sides within the slots lying one on top of the other, and the end connections having increased height and reduced thickness and lying in side-by-side relation.

In testimony whereof, I have hereunto subscribed my name this 13th day of November, 1922.

MAURICE F. JONES.